US007268948B2

(12) United States Patent
Matsuo et al.

(10) Patent No.: US 7,268,948 B2
(45) Date of Patent: Sep. 11, 2007

(54) OPTICAL ELEMENT AND OPTICAL SCANNING DEVICE USING THE SAME

(75) Inventors: Yasuhiro Matsuo, Kawasaki (JP); Yoshihiro Ishibe, Utsunomiya (JP); Kazumi Kimura, Toda (JP); Kentarou Nomura, Tsuchiura (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 11/088,847

(22) Filed: Mar. 25, 2005

(65) Prior Publication Data

US 2005/0219353 A1    Oct. 6, 2005

(30) Foreign Application Priority Data

Mar. 31, 2004    (JP) .............................. 2004-105246

(51) Int. Cl.
*G02B 5/18* (2006.01)
(52) U.S. Cl. ...................... 359/575; 359/206; 359/574; 359/601
(58) Field of Classification Search ................ 359/574, 359/575, 206, 601
See application file for complete search history.

(56) References Cited

U.S. PATENT DOCUMENTS

| 5,134,524 A | 7/1992 | Hamano et al. ............. 359/687 |
| 5,341,243 A | 8/1994 | Okuyama et al. ........... 359/687 |
| 5,682,269 A | 10/1997 | Kimura et al. .............. 359/770 |
| 6,021,004 A | 2/2000 | Sekita et al. ................ 359/676 |
| 6,097,550 A | 8/2000 | Kimura ....................... 359/729 |
| 6,124,986 A | 9/2000 | Sekita et al. ................ 359/691 |
| 6,139,713 A | 10/2000 | Masuda et al. ............. 205/206 |
| 6,166,866 A | 12/2000 | Kimura et al. .............. 359/729 |
| 6,292,309 B1 | 9/2001 | Sekita et al. ................ 359/729 |
| 6,301,064 B1 | 10/2001 | Araki et al. ................. 359/834 |
| 6,308,011 B1 | 10/2001 | Wachi et al. .................. 396/72 |
| 6,351,333 B2 | 2/2002 | Araki et al. ................. 359/566 |
| 6,366,411 B1 | 4/2002 | Kimura et al. .............. 359/729 |
| 6,426,841 B1 | 7/2002 | Araki et al. ................. 359/834 |
| 6,636,360 B1 | 10/2003 | Tanaka et al. .............. 359/678 |
| 6,639,729 B2 | 10/2003 | Tanaka et al. .............. 359/676 |
| 6,785,060 B2 | 8/2004 | Kimura et al. .............. 359/729 |
| 6,836,281 B2 | 12/2004 | Kimura ....................... 347/244 |
| 6,842,280 B2 | 1/2005 | Araki et al. ................. 359/365 |
| 2002/0179827 A1 | 12/2002 | Kimura ....................... 250/234 |
| 2003/0174201 A1 | 9/2003 | Kimura ....................... 347/258 |
| 2004/0051922 A1 | 3/2004 | Kimura ....................... 359/197 |
| 2005/0094277 A1* | 5/2005 | Khusnatdinov et al. ..... 359/601 |
| 2005/0105150 A1* | 5/2005 | Raguin ......................... 359/15 |
| 2005/0219353 A1 | 10/2005 | Matsuo et al. .............. 347/244 |

FOREIGN PATENT DOCUMENTS

JP    02-254192    10/1990

(Continued)

*Primary Examiner*—Leonidas Boutsikaris
(74) *Attorney, Agent, or Firm*—Fitzpatrick, Cella, Harper & Scinto

(57) ABSTRACT

To obtain an optical element capable of obtaining uniform anti reflection characteristics over the whole optical surface having a finite curvature of the optical element, a plurality of convex optical pieces having an anti reflection function are provided on a surface having the finite curvature of the optical element independently along a normal direction of the surface having the finite curvature of the optical element.

11 Claims, 7 Drawing Sheets

500nm

FOREIGN PATENT DOCUMENTS

| | | |
|---|---|---|
| JP | 2000-071290 | 3/2000 |
| JP | 2001-074919 | 3/2001 |
| JP | 2003-270569 * | 9/2003 |
| JP | 2004-109315 | 4/2004 |
| WO | WO 03/052467 A1 | 6/2003 |

* cited by examiner

|—————|
500nm

OPTICAL ELEMENT AND OPTICAL SCANNING DEVICE USING THE SAME

BACKGROUND OF THE INVENTION

1. Field of the Invention

The present invention relates to an optical element having a function of suppressing a quantity of light reflected by an interface in an incidence/emission surface for light, a method of manufacturing the optical element, and an optical apparatus using the optical element, and is suitable for an image pickup device such as a camera or a video camera, or an optical scanning device used in a liquid crystal projector or an electrophotographic apparatus (such as a digital copying machine or a laser beam printer).

2. Related Background Art

Generally, in an optical element in which a quantity of light reflected on a surface is required to be suppressed, a signal layer or a plurality of layers of optical films having refractive indices different from one another are laminated on a surface of the optical element by a thickness of several tens to several hundreds of nanometers to obtain desired reflection characteristics. In order to form those optical films, there is used a vacuum film depositing method such as a vapor deposition method or a sputtering method, or a wet film depositing method such as a dip coating method or a spin coating method. Even with any of those film deposition means taken, the film deposition must be carried out after an optical element base is processed, so the optical element is difficult to manufacture, and thus there is a limitation in the reduction of cost.

On the other hand, it is known that the quantity of light reflected by the interface can be suppressed by a fine shape which is formed at a pitch equal to or smaller than a design wavelength on a surface of an optical element without using any of optical films. If the fine shape can be formed in a mold by utilizing that principle and an optical element can be manufactured along with forming of a base, it becomes possible to ultimately reduce the manufacturing cost.

Heretofore, a semiconductor manufacturing process has been widely used as a technique for forming a fine shape called a Sub Wave-length Structure (SWS). With this method, there is an advantage that a precisely designed SWS can be formed, but this method involves a problem in that there are many limitations to a case where the SWS is formed over a large area on a curved surface, and thus the SWS is very difficult to inexpensively (simply) manufacture.

On the other hand, a technique for forming the SWS by utilizing minute particles is proposed as one technique for simply manufacturing the SWS (refer to Japanese Patent Application Laid-Open Nos. 2000-071290 and 2001-074919 for example).

In a case of the technique disclosed in Japanese Patent Application Laid-Open No. 2000-071290 A, when the minute particles are utilized, the SWS can be formed in lump so as to have a large area. However, since the minute particles are continuously and uniformly arranged to construct the SWS, there has been a problem in that it is difficult to control a volume ratio or aspect ratio between a base material and an atmosphere, which determines reflection characteristics, and thus it is difficult to obtain an ideal anti reflection effect.

On the other hand, an anodic oxidation method is known as a technique with which the SWS can be inexpensively formed over a large area, and the aspect ratio can also be arbitrarily controlled. A metal such as aluminum as an anode is anodized in an acid electrolytic solution by supplying a current between the metal having the anode and a cathode, thereby forming fine holes. A technique for regularly arranging holes by utilizing the anodic oxidation, a technique for filling a different material in holes, and the like have been developed (refer to Japanese Patent Application Laid-Open No. H02-254192 and U.S. Pat. No. 6,139,713 for example).

When light is made incident to an optical element, unnecessary reflected light is generated from an incidence/emission surface of the optical element. A problem caused by the reflected light generated from the incidence/emission surface of the optical element at this time will hereinafter be described by giving a conventional laser beam printer (LBP) as an example. However, a problem to be solved by the present invention is related to nonconformity caused by Fresnel reflection generated on an interface to/from which light is made incident/emitted, and thus is not limited to the reflection of light from a surface of a solid.

FIG. 8 is a cross sectional view (main scanning cross sectional view) of a main portion in a main scanning direction of a conventional optical scanning device used in an LBP or the like.

In FIG. 8, divergent light beams emitted from a light source means 91 are made nearly parallel light beams or convergent light beams by a collimator lens 92. The resultant light beams (light quantity) are shaped by an aperture stop 93 to be made incident to a cylindrical lens 94 having a reflecting power only in a sub scanning direction. Of the light beams made incident to the cylindrical lens 94, the light beams within a main scanning cross section are emitted as they are, and the light beams within a sub scanning cross section are converged to be imaged nearly in the form of a line image in the vicinity of a deflecting surface 95*a* of an optical deflector 95 having a rotating polygon mirror.

Then, the light beams reflected and deflected by the deflecting surface 95*a* of the optical deflector 95 are guided to a photosensitive drum surface 97 as a surface to be scanned through imaging optical means (fθ lens system) 96 including two fθ lenses 96*a* and 96*b* each having fθ characteristics. The photosensitive drum surface 97 is optically scanned in a direction indicated by an arrow B (main scanning direction) with the light beams by rotating the optical deflector 95 in a direction indicated by an arrow A to record image information on the photosensitive drum surface 97.

In recent years, the fθ lens (optical element) constituting imaging optical means is constructed so as to have a free curved surface shape in many cases, and is generally made of plastic material with which the free curved surface shape is easy to make.

However, since an anti reflection film is difficult to be formed on a surface of a plastic lens from the technical and cost reasons, the anti reflection film may be omitted. As a result, the surface reflection may be generated from each optical surface to cause nonconformity. In other words, the surface reflected light generated from the surface of the fθ lens in which an anti reflection film is omitted may be reflected by other optical surfaces to finally reach a non-intentional portion on a surface to be scanned, thereby causing a ghost phenomenon.

In particular, when as shown in FIG. 8, the optical surface (fθ lens surface) 96*a*1 of the fθ lens of the two fθ lenses which is disposed relatively nearer the optical deflector 95 has a concave shape and each of the incident light beams has a nearly perpendicular incidence angle, the nonconformity may be caused in which after the surface reflected light from the optical surface 96*a*1 returns back to the optical deflector 95 and is reflected again by a deflecting surface (reflecting surface) 95a of the optical deflector 95 to pass through the imaging optical means 96, the reflected light reaches a non-intentional portion on the photosensitive drum 97 to cause a ghost phenomenon.

SUMMARY OF THE INVENTION

It is an object of the present invention to provide an optical element which is capable of obtaining uniform anti reflection characteristics over the whole optical surface of the optical element having a finite curvature, a method of manufacturing the optical element, and an optical scanning device using the optical element.

According to one aspect of the invention, an optical element having a surface having a finite curvature includes a plurality of convex optical members having an anti reflection function, each of which is smaller than a design wavelength being provided on the surface having the finite curvature of the optical element, and in the optical element, the plurality of optical members are formed independently on the surface having the finite curvature along a normal direction of the surface having the finite curvature.

According to a further aspect of the invention, in the optical element, a following condition is satisfied, $$D<\lambda/2,$$

where D represents a center-to-center distance between the adjacent optical members of the plurality of optical members, and $\lambda$ represents a wavelength in use.

Among the plurality of the optical pieces, the average distance D between the centers of the adjacent optical pieces satisfies the following conditional expression, $$D/200<\sigma<D/10,$$

where $\sigma$ represents the standard deviation. That is, the anti reflection characteristic independent of the incidence direction of the light can be obtained when the standard deviation $\sigma$ of the distance between the optical pieces is greater than 0.5% of the average D, and the anti reflection characteristic with respect to the short wavelength region can be obtained when the standard deviation $\sigma$ of the distance between the optical pieces is less than 10% of the average D.

According to a further aspect of the invention, in the optical element, the plurality of optical members are disposed at random on the surface having the finite curvature of the optical element.

According to a further aspect of the invention, in the optical element, the plurality of optical members include optical members which are independent of one another.

According to a further aspect of the invention, in the optical element, each of the plurality of optical members becomes radially slenderer as becoming more distant from the surface having the finite curvature of the optical element.

According to a further aspect of the invention, in the optical element, each of the plurality of optical members becomes radially slenderer stepwise as becoming more distant from the surface having the finite curvature of the optical element.

According to a further aspect of the invention, in the optical element, each of the plurality of optical members becomes radially slenderer in a tapered form as becoming more distant from the surface having the finite curvature of the optical element.

According to a further aspect of the invention, in the optical element, the surface of the optical element having the finite curvature and having the plurality of optical members formed thereon is a refracting surface.

According to a further aspect of the invention, in the optical element, the plurality of optical members are formed on the surface having the finite curvature of the optical element through molding.

According to another aspect of the invention, a method of manufacturing an optical element set out in the foregoing, includes: a mold manufacturing step of forming pores formed during anodization of aluminum on a surface of a mold; and an element forming step of transferring the pores by use of the mold to form the optical members.

According to another aspect of the invention, an optical scanning device includes: the optical element set out in the foregoing; and an fθ lens having the optical element disposed on its surface.

According to another aspect of the invention, an image forming apparatus includes: the optical scanning device set out in the foregoing; a photosensitive member disposed on a surface to be scanned; a developing device for developing an electrostatic latent image formed on the photosensitive member with light beams scanned by the optical scanning device as a toner image; a transferring device for transferring the toner image obtained through the development to a transfer material; and a fixing device for fixing the transferred toner image on the transfer material.

According to another aspect of the invention, an image forming apparatus includes: the optical scanning device set out in the foregoing; and a printer controller for converting code data inputted from an external device into an image signal to input the image signal to the optical scanning device.

According to the present invention, it is possible to realize an optical element which is capable of obtaining uniform anti reflection characteristics over the whole optical surface by providing a plurality of convex optical members having an anti reflection function on a surface of the optical element having a finite curvature.

DETAILED DESCRIPTION OF THE PREFERRED EMBODIMENTS

A definition of a Sub Wave-length Structure (SWS) used in Embodiments will hereinafter be described.

A grating pitch P meeting the conditions for a so-called 0-oder grating is selected for a fine structure grating (Length-length Structure) used in Embodiments. The fine structure grating is referred to as a Length-length Structure (SWS) and its grating pitch is smaller than that of a normal diffraction grating by one digit to two digits. Then, the SWS is aimed at use of 0-order light having no diffraction operation.

The grating pitch is smaller than a design wavelength, i.e., is equal to or smaller than the order of submicron.

The 0-order grating means a grating in which no diffracted light other than the diffracted light in the 0-order grating is generated in the SWS.

Embodiment 1

Figure 1A:
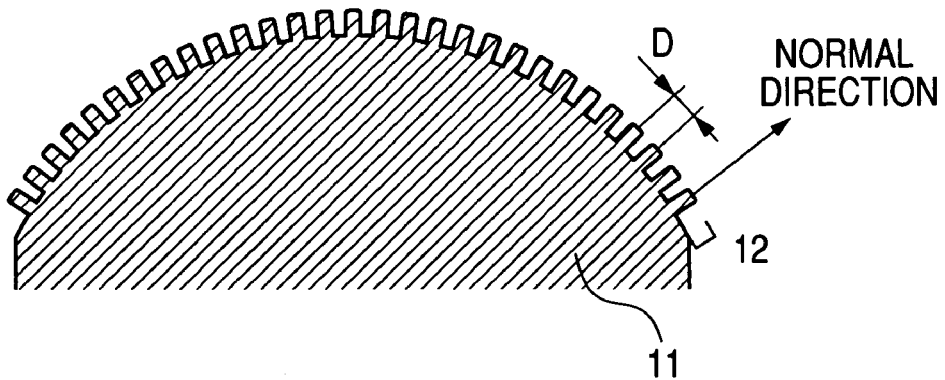
FIGS. 1A and 1B are views each schematically showing a cross section of an optical element according to Embodiment 1 of the present invention.
Figure 1B:
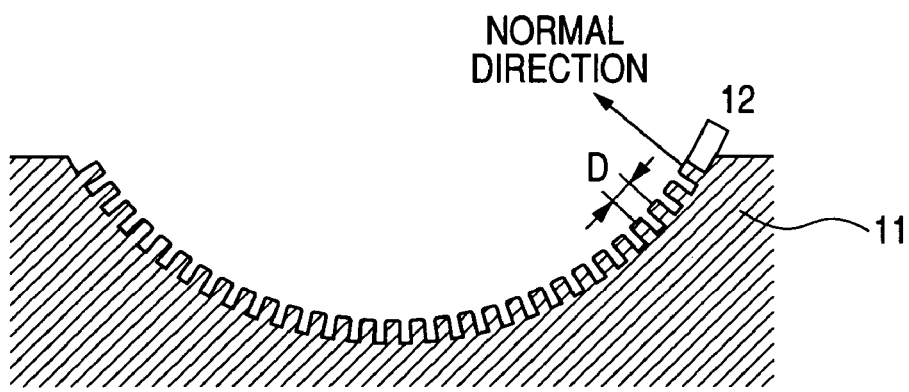

FIGS. 1A and 1B are views each schematically showing a cross section of an optical element according to Embodiment 1 of the present invention. FIG. 1A shows a case where a base shape of an optical surface has a convex surface, and FIG. 1B shows a case where a base shape of an optical surface has a concave surface.

In FIGS. 1A and 1B, reference numeral 11 designates an optical element (optical member) having a finite curvature (a finite curvature except for infinity). A base shape of an optical surface of the optical element 11 is formed so as to have a convex surface or a concave surface. The optical surface of the optical element 11 in Embodiment 1 has a refracting surface for example.

Figure 3A:
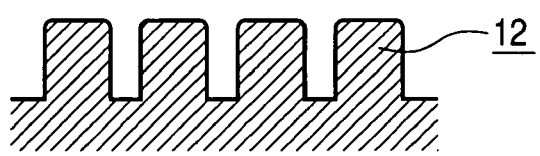
FIGS. 3A, 3B, 3C, 3D, and 3E are views schematically showing cross sections of optical pieces according to Embodiments 1 and 2 of the present invention.

FIG. 3A is a schematic view schematically showing a cross section of a plurality of optical pieces according to Embodiment 1 of the present invention.

Reference numeral 12 designates a fine optical piece (convex portion) having an anti reflection function. A plurality of optical pieces 12 are formed at random on a surface (its base shape has a concave surface or a convex surface) of the optical element 11 having the finite curvature. The plurality of optical pieces 12 each have nearly the same convex shape, and a thickness of each optical piece 12 is nearly uniform as becoming more distant from the surface of the optical element 11. Those optical pieces 12 are formed so as to stand independently along a normal direction of the surface of the optical element 11.

Here, the anti reflection function means a function of reducing a reflectivity of the surface having those optical pieces formed thereon as compared with a reflectivity of a mirror surface, preferably reducing it to less than a half of that of mirror surface, and more preferably reducing it to less than a quarter of that of mirror surface. In addition, the convex shape means a shape a part of which projects, and includes a columnar shape, a many-sided columnar shape, and the like for example.

Note that while the plurality of optical pieces 12 have the independent optical pieces, the plurality of optical pieces 12 may also be made have joined optical pieces. In addition, the plurality of optical pieces 12 are formed on the surface of the optical element having the finite curvature through the molding process.

Figure 2A:
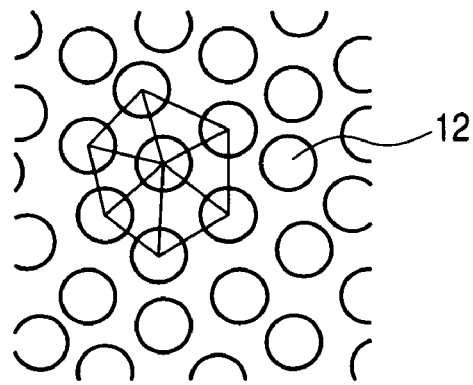
FIGS. 2A and 2B are views each schematically showing arrangement of optical pieces according to Embodiment 1 of the present invention.
Figure 2B:
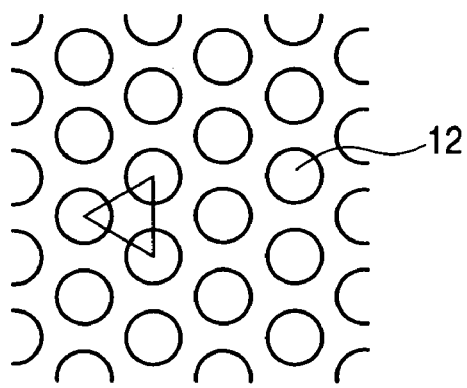

FIGS. 2A and 2B are schematic views each schematically showing arrangement of the plurality of optical pieces according to Embodiment 1 of the present invention.

FIG. 2A shows a case of Embodiment 1 where the plurality of optical pieces 12 are disposed at random on the surface of the optical element 11 having the finite curvature, and FIG. 2B shows a case where a plurality of optical pieces 12 are disposed in triangular grating shape on the surface of the optical element 11 having the finite curvature.

In Embodiment 1, D and λ are set so as to meet the following condition, $$D < \lambda/2 \qquad (1),$$

where D represents a center-to-center distance of adjacent optical pieces 12 of a plurality of optical pieces 12, and λ represents a wavelength in use.

Conditional Equation (1) regulates an upper limit of the center-to-center distance D of the adjacent optical pieces 12. Thus, if the center-to-center distance D exceeds the upper limit regulated by Conditional Equation (1), it becomes difficult to make the excellent anti reflection characteristics appear uniformly over the whole optical surface. This is not preferable. In addition, there is no limit to a lower limit in terms of a function, and thus the lower limit may be infinitely small as long as a volume ratio between the optical pieces and the atmosphere which will be described later is suitable.

Note that the center-to-center distance D between the adjacent optical pieces 12 means a center-to-center distance when the optical pieces 12 are disposed approximately in triangular grating shape. In other words, as shown in FIG. 2A, averages of the center-to-center distances between the closest six optical pieces 12 two by two are obtained for all the optical pieces 12 within a measurement area, and an average value of those averages is defined as the center-to-center distance between the adjacent optical pieces 12 in this arrangement.

In Embodiment 1, as described above, a plurality of optical pieces 12 which have nearly the same convex shape are formed on the surface of the optical element 11 having the finite curvature independently along a normal direction of the surface thereof, thereby making the excellent anti reflection characteristics appear uniformly over the whole optical surface.

In Embodiment 1, in order to make the anti reflection characteristics appear, the distance between the adjacent optical pieces 12 is especially desirably equal to or smaller than ½ of the design wavelength λ of the optical element 11 for which it is said that no 0-order diffracted light is generated.

Then, in Embodiment 1, the center-to-center distance D between the adjacent optical pieces 12 is set so as to meet Conditional Equation (1), thereby realizing the anti reflection function.

Here, the design wavelength means a wavelength of light which is transmitted through the optical element or reflected by the optical element, and designates a wavelength at which a quantity of reflected light is aimed at being suppressed. For example, in a case where when visible light is transmitted through the optical element and a quantity of reflected light having a wavelength of equal to or smaller than 600 nm is intended to be suppressed, the design wavelength is regarded as 600 nm, and thus the distance between the adjacent optical pieces 12 is desirably equal to or smaller than 300 nm. Or, since a laser beam having a wavelength of 780 nm is used in the laser beam printer exemplified in the related art, the distance between the adjacent optical pieces 12 is desirably equal to or smaller than 390 nm.

In addition, in Embodiment 1, a plurality of optical pieces 12 are disposed at random on the surface of the optical element 11 having the finite curvature. That is, when the optical pieces are given certain regularity in disposing the optical pieces, there is an advantage that the sharp anti reflection characteristics are obtained for a wavelength, however there is a possibility that the angle dependency may occur in the optical characteristics. For example, when the optical pieces are regularly disposed on a triangular lattice as shown in FIG. 2B, the distance between the optical pieces when the optical pieces are disposed along the arrangement direction is the shortest, and the distance between the optical pieces when the optical pieces are disposed along the direction making 30° with respect to the arrangement direction is the longest. As a result, the anti reflection characteristics are shifted depending on the incidence directions of the light.

Then, in Embodiment 1, in order to obtain the optical characteristics which are stable without depending on the incidence directions of the light, a plurality of optical pieces are disposed at random.

In general, when two kinds of materials different in refractive index from each other mixedly exist at a pitch shorter than the wavelength, a refractive index n12 of an area in which the two materials mixedly exist can be approximately expressed by Equation (2) based on refractive indices n1 and n2 of the two materials and volumes ff1 and ff2 which the two materials occupy per volume:

$$n12 = ff1 \times n1 + ff2 \times n2 \quad (2)$$

At this time, when only the two materials exist in the mixture area, Equation (3) is established:

$$ff1 + ff2 = 1 \quad (3)$$

In a case where the light is made incident vertically from the material 1 to the material 2, or from the material 2 to the material 1, the highest anti reflection effect is obtained when the refractive index n12 of the mixture area meets Equation (4).

$$n12 = \sqrt{n1 \times n2} \quad (4)$$

For example, in a case where the optical pieces contact the atmosphere, letting b be a refractive index of the material of which each optical piece is made, a ratio ff which projections having the highest anti reflection effect occupy per volume is expressed by Equation (5):

$$ff = \frac{\sqrt{n} - 1}{n - 1} \quad (5)$$

If the optical surface formed by the optical pieces is the uppermost surface contacting the atmosphere, and a refractive index n of the material of which each optical piece is made is 1.56, in order to obtain the maximum anti reflection effect for the vertical light incidence, the volume ratio which the optical pieces occupy is especially preferably about 44% from Equation (5). In addition, the optimal value of the volume ratio is suitably set based on not only the refractive index of the material of which each optical piece is made, but also an incidence angle and polarization of the light. Empirically, the optical pieces are especially preferably formed at the volume ratio of 38 to 65% in terms of obtaining the desired anti reflection characteristics.

As described above, in Embodiment 1, a plurality of convex optical pieces 12 having the anti reflection function are provided on the surface of the optical element 11 having the finite curvature in such a manner, thereby realizing the anti reflection characteristics which are made appear uniformly over the whole optical surface.

Embodiment 2

FIGS. 3B, 3C, 3D and 3E are schematic views each schematically showing a cross section of a plurality of optical pieces according to Embodiment 2 of the present invention.

Embodiment 2 is different from Embodiment 1 in that an optical piece is formed in shape of becoming radially slenderer (toward a head portion) as distant from the surface of the optical element 11 having the finite curvature. Other constructions and optical operations are nearly the same as those in Embodiment 1, and thus the same effects as those in Embodiment 1 are obtained.

Figure 3B:
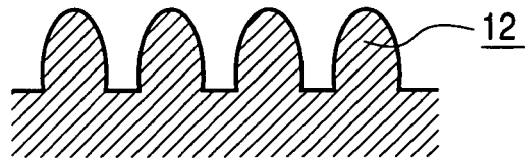
Figure 3C:
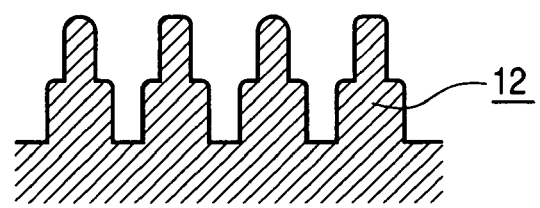
Figure 3D:
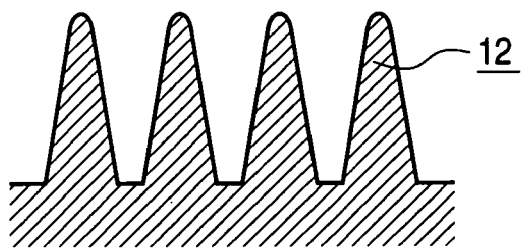
Figure 3E:
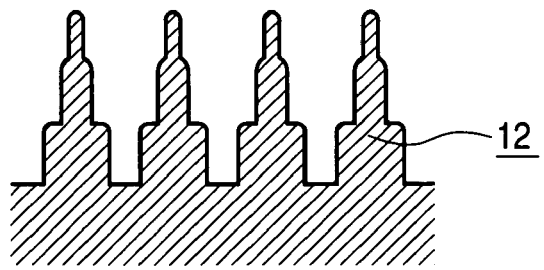

FIG. 3B shows a situation in which a radial thickness of the optical piece 12 becomes slenderer toward a head portion, FIG. 3C shows a situation in which a radial thickness of the optical piece 12 becomes slenderer in shape having one step toward a head portion, FIG. 3D shows a situation in which a radial thickness of the optical piece 12 becomes slenderer in a tapered manner toward a head portion, and FIG. 3E shows a situation in which a radial thickness of the optical piece 12 becomes slenderer in shape having multiple steps toward a head portion.

A plurality of optical pieces 12 of Embodiment 2 are disposed at random on the surface (its base shape has a concave surface or a convex surface) of the optical element having the finite curvature similarly to Embodiment 1 described above, and are also formed independently along the normal direction of that surface. In addition, similarly to Embodiment 1, the center-to-center distance D between the adjacent optical pieces 12 is set so as to satisfy the conditional expression (1) described above.

In Embodiment 2, as described above, the optical piece 12 is formed so as to become radially slenderer as distant from the surface of the optical element (toward the head portion) to change an equivalent refractive index n12 toward the head portion, thereby obtaining the excellent anti reflection characteristics.

Here, the equivalent refractive index n12 designates a refractive index expressed by Equation (6).

In general, when two kinds of materials different in refractive index from each other mixedly exist at a pitch shorter than a wavelength, a refractive index of an area in which the two materials mixedly exist can be approximately expressed by Equation (6) as the equivalent refractive index n12 based on refractive indices n1 and n2 of the two materials and volumes ff1 and ff2 which the two materials occupy per volume.

$$n12 = ff1 \times n1 + ff2 \times n2 \quad (6)$$

At this time, when only the two materials exist in the mixture area, Equation (7) is established:

$$ff1 + ff2 = 1 \quad (7).$$

When the material 2 is the atmosphere (n2=1), the equivalent refractive index n12 is expressed by Equation (8):

$$n12 = ff1 \times (n1 - 1) + 1 \quad (8).$$

In contrast to the construction in which the optical piece 12 has the same thickness in a height direction or the optical piece 12 becomes radially thicker toward its head portion, the optical piece 12 has the construction of becoming slenderer toward its head portion. Therefore, it is possible to reduce a change in refractive index in a boundary surface between the material 1 and the mixture area or between the material 2 and the mixture area. As a result, the excellent anti reflection effect can be obtained.

In addition, in Embodiment 2, as shown in FIG. 3C, the optical piece 12 is formed in shape in which the radial size of the optical piece 12 becomes slenderer stepwise as distant from the surface of the optical element 11. That is, since the equivalent refractive index changes every step from the refractive index of the material 1 to the refractive index of the material 2, the excellent anti reflection characteristics are obtained. In addition, the optical piece 12 may be relatively readily formed by making the radial size of the optical piece 12 slenderer in a shape having one step in the means for forming a fine shape in which the radial size of the optical piece becomes slenderer toward the head portion. Thus, this is preferable.

In addition, in Embodiment 2, as shown in FIG. 3D, the optical piece 12 is formed in shape in which the radial size of the optical piece 12 becomes slenderer in a tapered manner as distant from the surface of the optical element 11. That is, since the equivalent refractive index changes steplessly from the refractive index of the material 1 to the refractive index of the material 2, the especially excellent anti reflection characteristics are obtained.

In addition, in Embodiment 2, as shown in FIG. 3E, the optical piece 12 is formed in shape in which the radial size of the optical piece 12 becomes slenderer in a multi-step form as distant from the surface of the optical element 11. That is, since the equivalent refractive index changes every step of the multiple steps from the refractive index of the material 1 to the refractive index of the material 2, the excellent anti reflection characteristics are obtained.

Also, in Embodiment 2, the anti reflection function of a plurality of optical pieces 12 shown in each of FIGS. 3B, 3C, 3D, and 3E has the following features as compared with the case shown in FIG. 3A:

(1) incidence angle characteristics become excellent; and (2) the wavelength range of the anti reflection characteristics is widened.

Next, a method of manufacturing the optical element 11 of the present invention will be described.

It should be noted that a method of manufacturing the optical element 11 of the present invention is not limited to the following manufacturing methods. In addition, the present invention aims at the anti reflection for a P polarization laser for emitting a laser beam having a wavelength of 780 nm. However, the anti reflection characteristics of the optical element 11 obtained from the present invention are not limited to the anti reflection characteristics of a single wavelength laser, and hence can also be applied to visible light, ultraviolet light, or infrared light.

In the present invention, the optical element 11 is manufactured using a mold manufacturing process for forming pores which are formed when aluminum or aluminum alloy is anodized on a surface of a mold, and an element forming process for forming optical pieces 12 by transferring the pores using the mold.

Here, the anodic oxidation is a technique in which an aluminum member or an aluminum alloy member is immersed as a positive electrode together with a negative electrode into an electrolytic solution containing sulfuric acid, oxalic acid, or phosphoric acid, and a D.C. power supply is connected between the aluminum member or the aluminum alloy member and the negative electrode, and a current is caused to flow through the aluminum member or the aluminum alloy member and the negative electrode to anodize the surface of the aluminum member or the aluminum alloy member, thereby forming pores each having a size on the order of submicron in a direction perpendicular to the surface of the aluminum member or the aluminum alloy member.

In addition, it is known that the pitch and diameter of the pores can be controlled by suitably selecting the anodic oxidation conditions. The conditions for the anodic oxidation method are suitably selected, and the desired pores are then collectively formed on the surface of the mold, thereby allowing the SWS to be inexpensively formed in a short time.

In addition, any of molding means such as the injection molding, the replica molding, the press molding, and cast molding may be adopted as the means for transferring pores formed on the surface of the mold. However, the injection molding and the press molding are especially desirable with each of which the SWS can be efficiently transferred and formed together with the base. In addition, when the optical pieces are peeled off from the mold, the standing direction of the optical pieces and the peeling-off direction are not necessarily parallel with each other. However, before the optical pieces are allowed to be deformed to some degree, e.g., before the optical pieces perfectly solidify, the optical pieces can be readily peeled off from the mold.

Manufacturing Method 1

Method 1 of manufacturing the optical element will hereinafter be described.

First of all, the mold having a free curved surface for forming an fθ lens (optical element) was prepared, and a primer layer and an aluminum layer were uniformly deposited on the free curved surface in this order by utilizing the sputtering to obtain the free curved surface covered with the aluminum layer. Then, a positive electrode was mounted to a part of the surface except for the free curved surface, and the overall mold was coated with a masking tape so as to expose only the free curved surface to obtain an insulating water proof state for a portion other than the free curved surface through the coating. Then, the mold having the positive electrode was immersed together with the negative electrode into a 5-wt % phosphoric acid solution at a regulated temperature of 10° C. Thereafter, 120 V was applied from a D.C. power supply across the positive electrode and the negative electrode. The application of the D.C. voltage was continued until a current caused to flow through the positive electrode and the negative electrode became sufficiently weak, thereby obtaining the mold having pores which were disposed at random and perpendicularly to the surface of the mold. Moreover, the resultant mold was immersed into a 5-wt % phosphoric acid solution at a room temperature, and the pore diameters were widened while the porous aluminum oxide film was gradually dissolved, thereby obtaining the mold having a desired pore shape for the fθ lens.

The mold for the fθ lens thus obtained was observed using a scanning electron microscope, and a central position of one pore was obtained through the image processing, and the center-to-center distances D between the central pore and the closest six pores surrounding the central pore were obtained. As a result, it was found out that the center-to-center distance D between the adjacent pores was about 300 nm in pitch.

The mold manufactured in accordance with the above procedure was disposed on each of an incidence surface side and an emission surface side in an injection molding machine (SS180 manufactured by SUMITOMO HEAVY INDUSTRIES LTD.), and a cycloolefin polymer (manufactured by ZEON CORPORATION) was subjected to the injection molding, thereby obtaining the fθ lens. At this time, a melting resin temperature was set at 270° C., and a pressure during the resin injection was set at 700 kg/cm².

Figure 4:
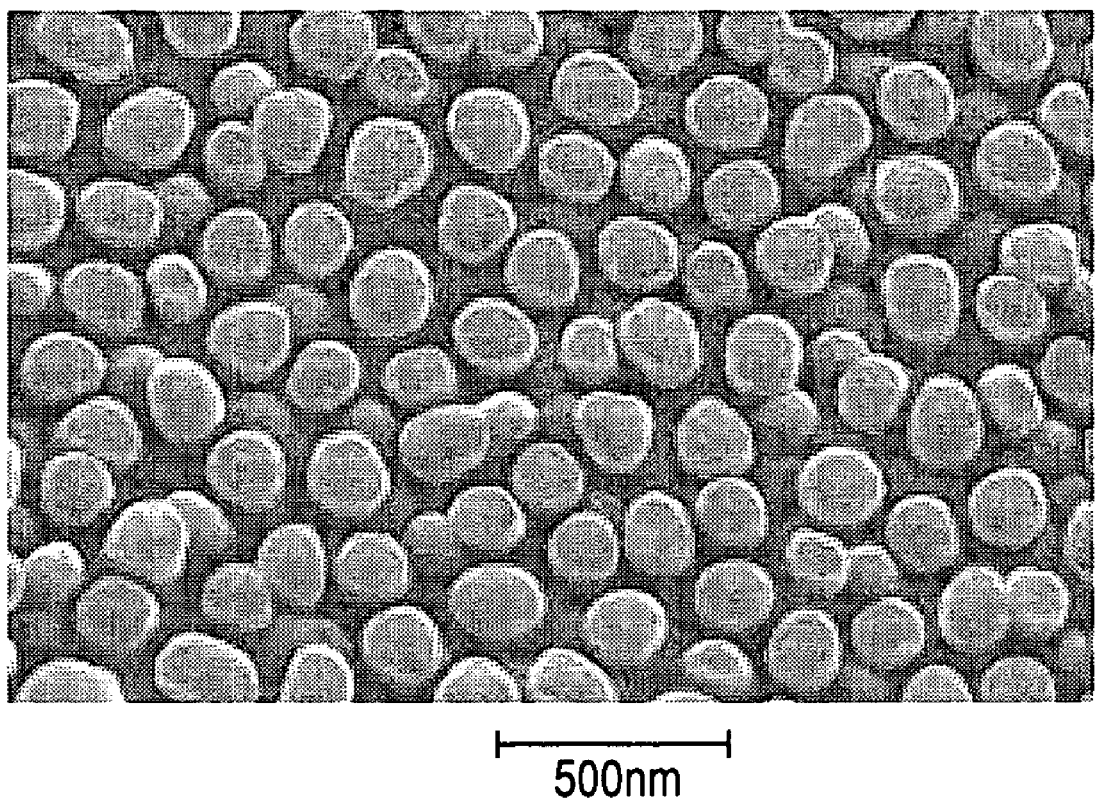
FIG. 4 is a view of an fθ lens observed with a scanning electron microscope.

When the fθ lens thus obtained was observed using a scanning electron microscope, columnar optical pieces disposed at random over the whole curved surface were observed as shown in FIG. 4. Also, it was verified that the individual columnar optical pieces stood along the normal direction of the surface of the mold.

In addition, when the central position of one optical piece was obtained through the image processing, and an average of the center-to-center distances D between the central optical piece and the closest six columnar optical pieces surrounding the central optical piece was obtained. As a result, it was found out that the center-to-center distance D between the adjacent optical pieces was about 300 nm (this value satisfies the conditional expression (1) described above), and it was verified that the pores of the mold were transferred.

Moreover, when the heights of the columnar optical pieces were measured using an atomic force microscope, it was found out that the thickness of each optical piece was nearly uniform toward the head portion, the average height was about 160 nm, and the volume ratio of the optical pieces was about 56%. Then, when a reflectivity when the P polarized light having a wavelength of 780 nm was made incident vertically to the surface of the optical element was measured using a spectrophotometer, the reflectivity of 1.6% was obtained.

Comparative Example 1

Next, Comparative Example 1 with Manufacturing Method 1 will be described.

The mold having a free curved surface for forming the fθ lens (optical element) was prepared, and the injection molding was carried out similarly to Manufacturing Method 1. As a result, the fθ lens having the mirror surface in the free curved surface was obtained.

When the optical element thus obtained was observed using a scanning electron microscope, only the smooth surface was observed. Then, when a reflectivity when the P polarized light having a wavelength of 780 nm was made incident perpendicularly to the surface of the optical element was measured using a spectrophotometer, the reflectivity of 4.3% was obtained.

Manufacturing Method 2

Next, Method 2 of manufacturing the optical element will be described.

First of all, the mold having a free curved surface for forming the fθ lens (optical element) was prepared, and a primer layer and an aluminum layer were uniformly deposited on the free curved surface in this order by utilizing the sputtering to obtain the free curved surface covered with the aluminum layer. Then, a positive electrode was mounted to a part of the surface except for the free curved surface, and the overall mold was coated with a masking tape so as to expose only the free curved surface to obtain an insulating water proof state for a portion other than the free curved surface through the coating. Then, after the aluminum layer was anodized by a half of its thickness, the resultant porous aluminum oxide film was dissolved to widen the pore diameters of the pores. Then, the remaining aluminum film was anodized again to form the pores which became slenderer stepwise on the surface of the mold. That is, the mold having the positive electrode was immersed together with the negative electrode into a 5-wt % phosphoric acid solution at a regulated temperature of 10° C. for the anodic oxidation. Then, a D.C. constant voltage of 120 V was applied across the positive electrode and the negative electrode for a fixed time to form the pores by about half of the thickness of the aluminum film.

Next, the resultant mold was immersed into a 5 wt % phosphoric acid solution at a room temperature for one hour to dissolve the porous aluminum oxide film, thereby widening the pore diameters. The resultant mold having the positive electrode was immersed together with the negative electrode into the 5-wt % phosphoric acid solution at the regulated temperature of 10° C. again. Then, a D.C. constant voltage of 120 V was applied across the positive electrode and the negative electrode. The application of the D.C. voltage was continued until a current caused to flow through the positive electrode and the negative electrode became sufficiently weak. As a result, the surface of the mold for the fθ lens was obtained in which the pores were disposed at random and perpendicularly to the surface of the mold, and each pore diameter became slenderer stepwise in a depth direction.

The mold manufactured in accordance with the above procedure was disposed on each of an incidence surface side and an emission surface side in an injection molding machine (SS180 manufactured by SUMITOMO HEAVY INDUSTRIES LTD.), and a cycloolefin polymer (manufactured by ZEON CORPORATION) was subjected to the injection molding, thereby obtaining the fθ lens. At this time, a melting resin temperature was set at 270° C., and a pressure during the resin injection was set at 700 kg/cm².

When the fθ lens thus obtained was observed using a scanning electron microscope, the optical pieces were observed which were disposed at random over the whole curved surface, and each thickness of which became slender in shape having two steps as shown in FIG. 3C. Also, it was verified that the individual optical pieces stood along the normal direction of the surface of the mold. In addition, when a central position of one optical piece was obtained through the image processing, and an average of the center-to-center distances between the central optical piece and the closest six optical pieces surrounding the central optical piece was obtained, it was found out that the center-to-center distance D between the adjacent optical pieces was about 300 nm (this value satisfies the conditional expression (1) described above), and it was verified that the pores of the mold were transferred.

Moreover, when the heights of the columnar optical pieces were measured using an atomic force microscope, it was found out that an average height of the optical pieces was about 170 nm. Then, when a reflectivity when the P polarized light having a wavelength of 780 nm was made incident vertically to the surface of the optical element was measured using a spectrophotometer, the reflectivity of 1.5% was obtained.

Manufacturing Method 3

Next, Method 3 of manufacturing the optical element will be described.

The mold for the fθ lens was prepared which was obtained such that after a primer layer and an aluminum layer were deposited similarly to Manufacturing Method 2 described above, an insulating water proof processing was carried out for a portion other than the free curved surface. Then, the mold having the pores the diameters of which became gradually slenderer by repeatedly carrying out the anodic oxidation and the dissolution was obtained.

Specifically, the mold having the positive electrode was immersed together with the negative electrode into a 5-wt % phosphoric acid solution at a regulated temperature of 10° C. for the anodic oxidation. Then, a D.C. constant voltage of 120 V was applied across the positive electrode and the negative electrode for a fixed time to form the pores by about one-tenth of the thickness of the aluminum film. Next, the resultant mold was immersed into a 5 wt % phosphoric acid solution at a room temperature for 10 minutes to dissolve the porous aluminum oxide film, thereby widening the pore diameters. The surface of the mold for the fθ lens was obtained in which the pores were disposed at random and perpendicularly to the surface of the mold, and each pore diameter became slenderer in substantially a tapered form in the depth direction by repeating the above procedure ten times.

The mold manufactured in accordance with the above procedure was disposed on each of an incidence surface side and an emission surface side in an injection molding machine (SS180 manufactured by SUMITOMO HEAVY INDUSTRIES LTD.), and a cycloolefin polymer (manufactured by ZEON CORPORATION) was subjected to the injection molding, thereby obtaining the fθ lens. At this time, a melting resin temperature was set at 270° C., and a pressure during the resin injection was set at 700 kg/cm$^2$.

When the fθ lens thus obtained was observed using a scanning electron microscope, the optical pieces were observed which were disposed at random over the whole curved surface, and each thickness of which became in a tapered manner slender as shown in FIG. 3D. Also, it was verified that the individual optical pieces stood along the normal direction of the surface of the mold. In addition, when a central position of one optical piece was obtained through the image processing, and an average of the center-to-center distances between the central piece and the closest six optical pieces surrounding the central piece was obtained, it was found out that the center-to-center distance D between the adjacent optical pieces was about 300 nm (this value satisfies the conditional expression (1) described above), and it was verified that the pores of the mold were transferred.

Moreover, when the heights of the columnar optical pieces were observed using an atomic force microscope, it was found out that an average height of the optical pieces was about 180 nm. Then, when a reflectivity of the P polarized light having a wavelength of 780 nm was made incident perpendicularly to the surface of the optical element was measured using a spectrophotometer, the reflectivity of 1.5% or less was obtained.

Optical Apparatus

The optical element of the present invention can be applied to an image pickup apparatus such as a camera or a video camera, or a projection apparatus such as a liquid crystal projector, a display device, or an optical scanning device for an electrophotographic apparatus. For example, when in the optical scanning device for the electrophotographic apparatus, the fθ lens having a plurality of optical pieces formed therein is installed in the incidence surface or both the incidence and emission surfaces of the fθ lens constituting the imaging optical means, the satisfactory reflection characteristics are obtained.

Optical Scanning Device

Figure 5:
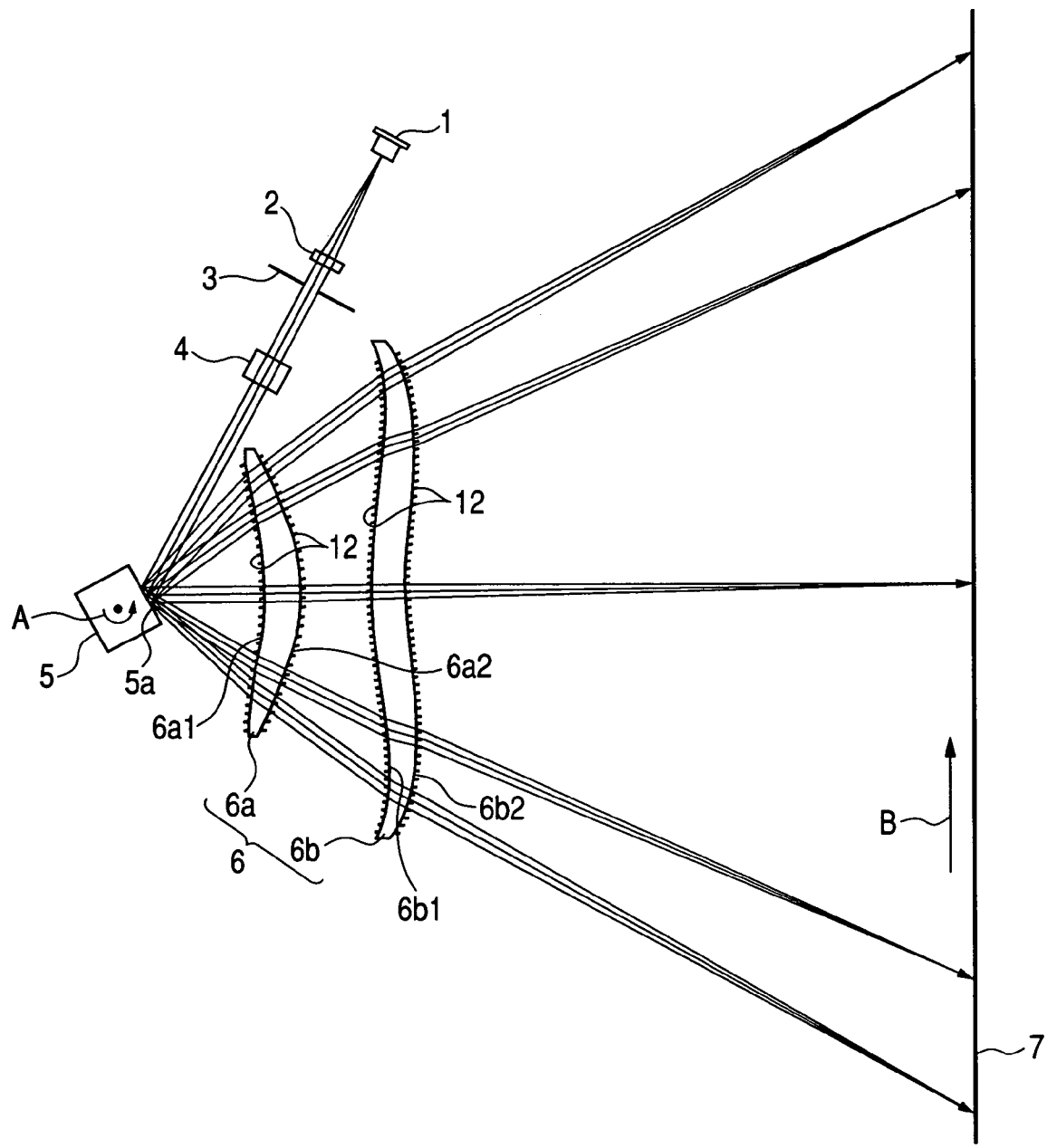
FIG. 5 is a cross sectional view of a main portion of an optical scanning device in which the optical element of the present invention is installed.

FIG. 5 is a schematic view of a main portion when the fθ lens including the optical element which was manufactured in accordance with any one of Manufacturing Methods 1 to 3 described above is applied to the imaging optical means of the optical scanning device for electrophotographic apparatus.

In FIG. 5, reference numeral 1 designates light source means (semiconductor laser) which includes a single beam laser, a multi-beam laser or the like for example. Reference numeral 2 designates a collimator lens for converting light beams emitted from the light source 1 into nearly parallel light beams. Reference numeral 3 designates an aperture stop for limiting passing light beams to shape a beam shape. Reference numeral 4 designates a cylindrical lens which has a predetermined optical power only in the sub scanning direction and which serves to image the light beams passed through the aperture stop 3 nearly in the form of a line image on a deflecting surface (reflecting surface) 5a of an optical deflector 5 which will be described later, within the sub scanning cross section.

Reference numeral 5 designates the optical deflector as deflecting means, including a four-sided polygon mirror (rotating polygon mirror) for example. The optical deflector 5 is rotated at a constant speed in a direction indicated by an arrow A in FIG. 5 by driving means (not shown) such as a motor.

Reference numeral 6 designates an fθ lens system as the imaging optical means having a condenser function and fθ characteristics. The fθ lens system 6 includes first and second fθ lenses 6a and 6b which were manufactured in accordance with any one of Manufacturing Methods 1 to 3 described above. In the fθ lens system 6, a plurality of optical pieces (convex portions) are formed on each of the incidence surfaces 6a1 and 6b1, and emission surfaces 6a2 and 6b2 of the first and second fθ lenses 6a and 6b. Thus, the fθ lens system 6 images the light beams, which are based on image information and have been obtained through the reflection and the deflection by the optical deflector 5, on a photosensitive drum surface 7 as a surface to be scanned. Also, the fθ lens system 6 establishes a conjugate relationship between the deflecting surface 5a of the optical deflector 5 and the photosensitive drum surface 7, and thus has a function of correcting optical face tangle error.

Reference numeral 7 designates the photosensitive drum surface 7 as a surface to be scanned.

In Embodiment, light beams emitted from the semiconductor laser 1 are converted into nearly parallel light beams by the collimator lens 2, and the resultant nearly parallel light beams (light quantity) are limited by the aperture stop 3 to be made incident to the cylindrical lens 4. Of the nearly parallel light beams made incident to the cylindrical lens 4, the nearly parallel light beams in the main scanning cross section are emitted from the cylindrical lens 4 as they are. In addition, the nearly parallel light beams converge within the sub scanning cross section to be imaged nearly in the form of a line image (a line image extending longitudinally in the main scanning direction) on the deflecting surface 5a of the optical deflector 5. Then, the light beams reflected and deflected by the deflecting surface 5a of the optical deflector 5 are imaged in the form of a spot on the photosensitive drum surface 7 through the first and second fθ lenses 6a and 6b. The photosensitive drum surface 7 is optically scanned at a constant speed in a direction (main scanning direction) indicated by an arrow B with the light beams by rotating the optical deflector 5 in a direction indicated by an arrow A. Thus, an image is recorded on the photosensitive drum surface 7 as a recording medium.

With the above construction, a quantity of reflected light on the incidence surface of the fθ lens (optical element) is suppressed, thereby preventing nonconformity such as generation of a ghost phenomenon or the like, or a quantity of transmitted light through the emission surface is enhanced, thereby allowing the high luminance and the energy saving to be realized. Moreover, with the above construction, it becomes possible to use the inexpensive fθ lens having the anti reflection function, and especially, it becomes possible to carry out the reduction of the cost corresponding to the number of optical elements in an optical device having a plurality of optical elements installed therein.

It should be noted that while in the above optical scanning device, a plurality of optical pieces 12 are formed on each of the incidence surfaces 6a1 and 6b1, and the emission surfaces 6a2 and 6b2 of the first and second fθ lenses 6a and 6b, the present invention is not intended to be limited thereto. That is, a plurality of optical pieces 12 may be formed only on the incidence surface and the emission surface of any one of the first and second fθ lenses 6a and 6b. In addition, a plurality of optical pieces 12 may be formed not only on both the incidence surfaces and the emission surfaces, but also on ones of the incidence surfaces and the emission surfaces.

Image Forming Apparatus

Figure 6:
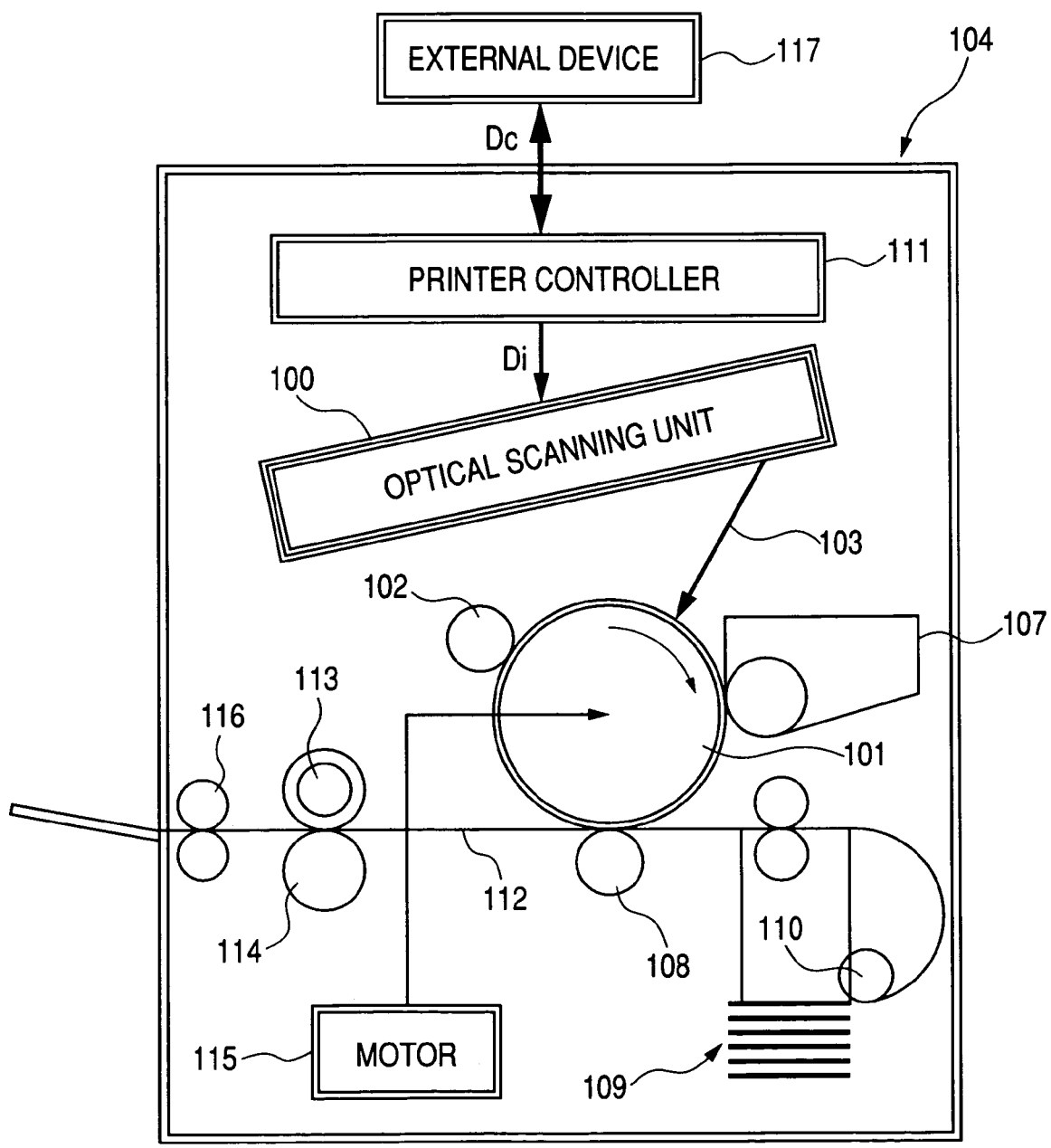
FIG. 6 is a cross sectional view of a main portion of an image forming apparatus of the present invention.

FIG. 6 is a cross sectional view of a main portion in a sub scanning direction according to Embodiment of an image forming apparatus of the present invention using the optical scanning device having the construction shown in FIG. 5. In FIG. 6, reference numeral 104 designates the image forming apparatus. Code data Dc is inputted from an external device 117 such as a personal computer to the image forming apparatus 104. The code data Dc is converted into image data (dot data) Di by a printer controller 111 provided inside the image forming apparatus 104. The image data Di is inputted to an optical scanning unit 100 having the construction shown in FIG. 5. Then, a light beam 103 which has been modulated in correspondence to the image data Di is emitted from the optical scanning unit 100. A photosensitive surface of a photosensitive drum 101 is scanned in the main scanning direction with the light beam 103.

The photosensitive drum 101 as an electrostatic latent image bearing member (photosensitive member) is rotated clockwise by a motor 115. Then, the photosensitive surface of the photosensitive drum 101 moves in a sub scanning direction intersecting perpendicularly the main scanning direction with respect to the light beam 103 as the photosensitive drum 101 is rotated clockwise. A charging roller 102 for charging uniformly the surface of the photosensitive drum 101 with electricity is provided above the photosensitive drum 101 so as to abut against the surface of the photosensitive drum 101. Then, the light beam 103 which is scanned by the above optical scanning unit 100 is applied to the surface of the photosensitive drum 101 which is charged with electricity by the charging roller 102.

As previously described, the light beam 103 is modulated based on the image data Di. An electrostatic latent image is formed on the surface of the photosensitive drum 101 by applying the light beam 103 to the surface of the photosensitive drum 101. The electrostatic latent image is developed in the form of a toner image by a developing device 107 which is disposed on a more downstream side in the rotation direction of the photosensitive drum 101 with respect to the application position of the above light beam 103 so as to abut against the surface of the photosensitive drum 101.

The toner image which has been obtained through the developing process in the developing device 107 is transferred onto a sheet 112 as a transfer target material by a transferring roller 108 which is disposed below the photosensitive drum 101 so as to face the surface of the photosensitive drum 101. While the sheets 112 are held in a sheet cassette 109 which is disposed in front of the photosensitive drum 101 (on a right-hand side in FIG. 6), the sheet can also be fed by manual feed. A sheet feeding roller 110 is disposed in an end portion of the sheet cassette 109, and serves to send the sheets 112 held within the sheet cassette 109 one by one to a conveyance path.

The sheet 112 onto which the unfixed toner image has been transferred in a manner as described above is further conveyed to a fixing device which is disposed in the rear of the photosensitive drum 101 (on a left-hand side in FIG. 6). The fixing device includes a fixing roller 113 having a fixing heater (not shown) provided therein, and a pressurizing roller 114 which is disposed so as to be pressed against the fixing roller 113. The fixing device serves to heat the sheet 112 conveyed thereto from the transferring portion while pressing the sheet 112 in a pressing portion between the fixing roller 113 and the pressurizing roller 114, thereby fixing the unfixed toner image on the sheet 112. Moreover, a sheet discharging roller 116 is disposed in the rear of the fixing roller 113 and serves to discharge the sheet 112 having therein the fixed toner image to the outside of the image forming apparatus 104.

While not illustrated in FIG. 6, the printer controller 111 carries out not only the conversion of the data which is previously described, but also the control for portions, such as the motor 115, within the image forming apparatus 104, and a polygon mirror and the like within an optical scanning unit which will be described later.

When a pattern image and a photograph image were repeatedly outputted using the image forming apparatus, no ghost phenomenon occurs, and there is no problem in durability.

Color Image Forming Apparatus

Figure 7:
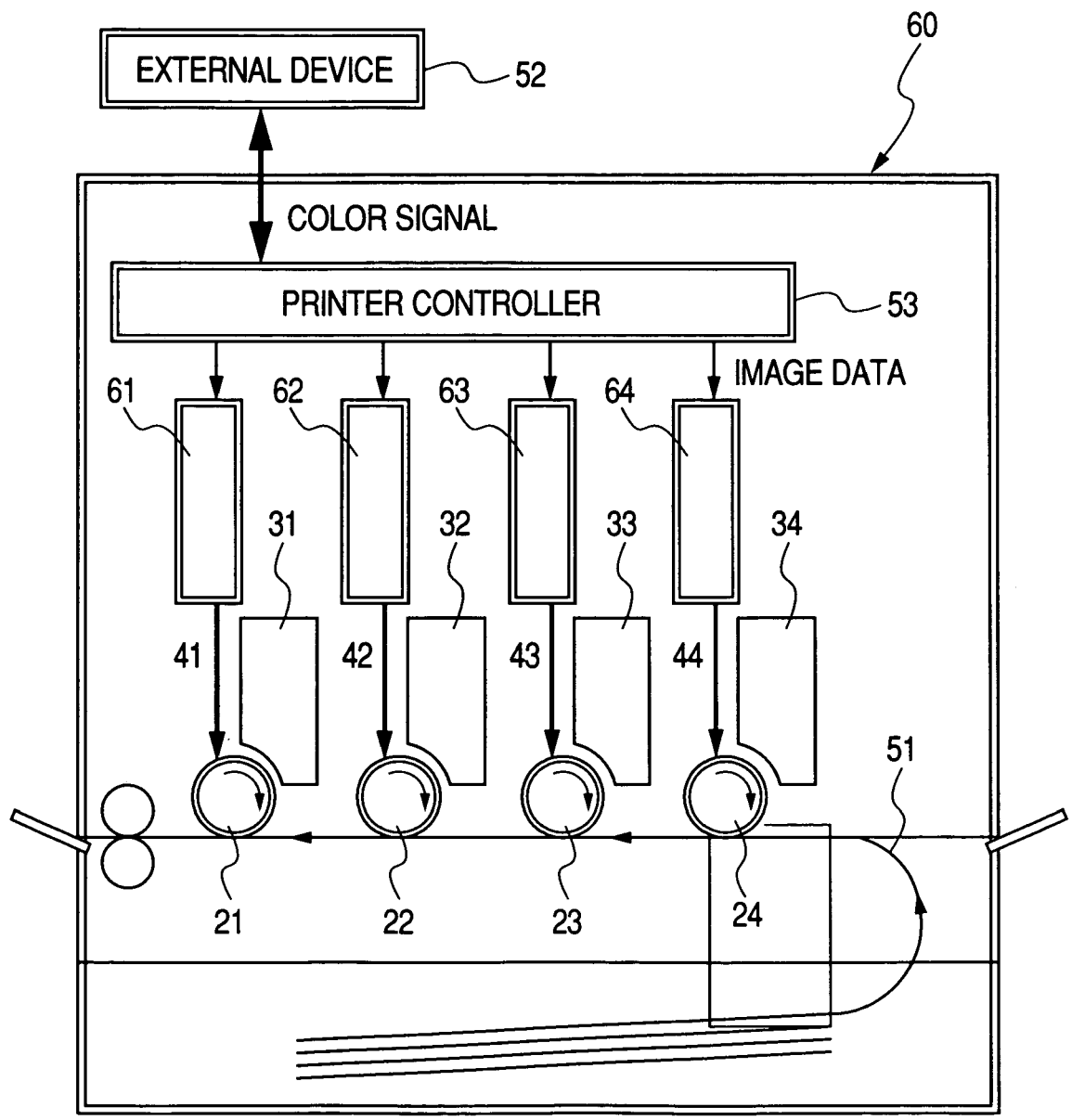
FIG. 7 is a cross sectional view of a main portion of a color image forming apparatus of the present invention.
Figure 8:
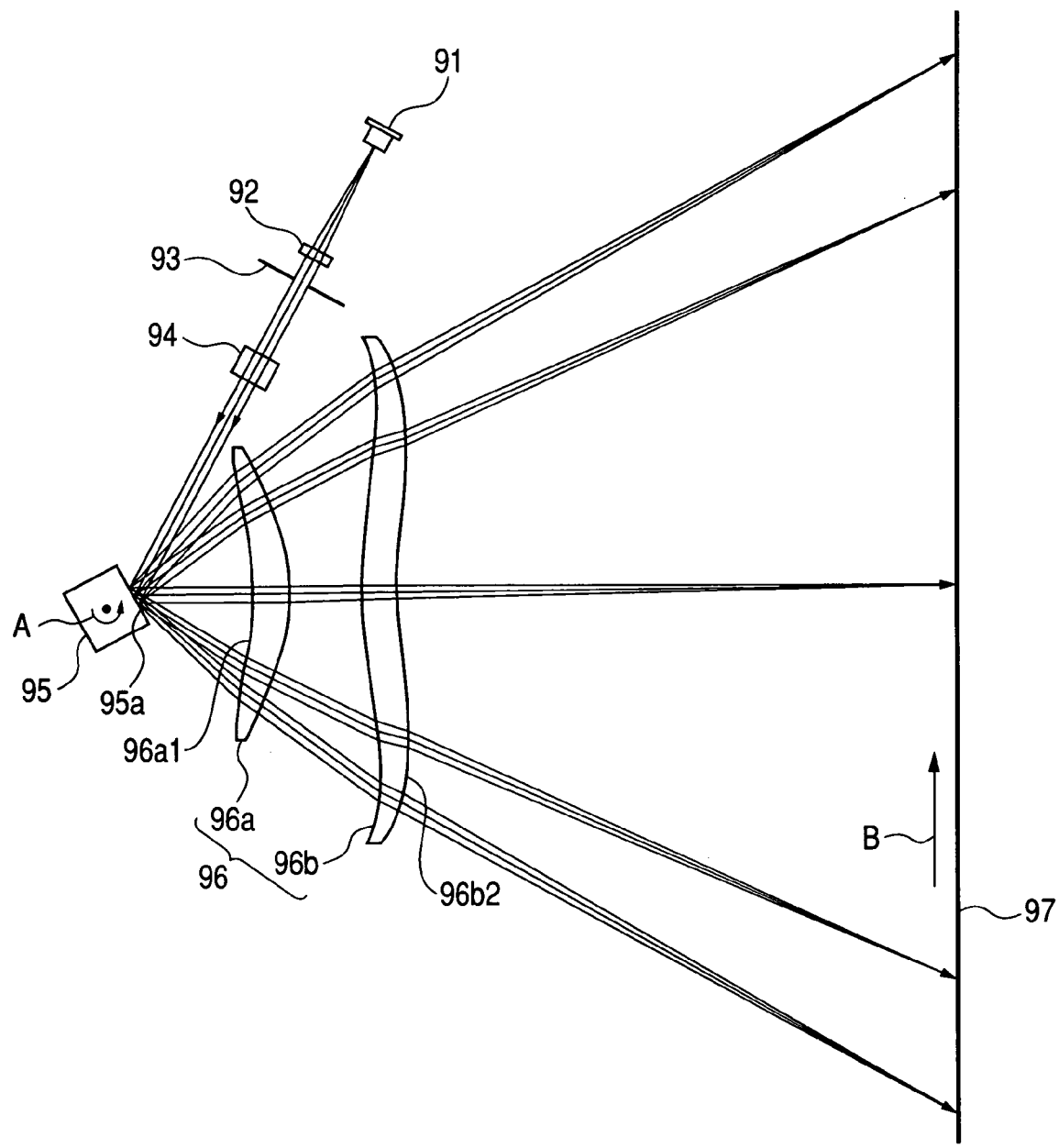
FIG. 8 is a cross sectional view of a main portion of a conventional optical scanning device.

FIG. 7 is a schematic view of a main portion of a color image forming apparatus according to Embodiment of the present invention using a plurality of optical scanning units each having the construction shown in FIG. 5. Embodiment relates to a tandem type color image forming apparatus for recording image information on surfaces of photosensitive drums as image bearing members in a parallel manner using four optical scanning devices which are disposed so as to correspond to the respective photosensitive drums. In FIG. 7, reference numeral 60 designates the color image forming apparatus, reference numerals 61, 62, 63 and 64 designate respectively the optical scanning devices each having the construction shown in FIG. 5, reference numerals 21, 22, 23 and 24 designate the photosensitive drums as image bearing members, respectively, reference numerals 31, 32, 33 and 34 designate developing devices, respectively, and reference numeral 51 designates a conveyor belt.

In FIG. 7, color signals corresponding to R (red), G (green), and B (blue) are inputted from an external device such as a personal computer to the color image forming apparatus 60. Those color signals are converted into image data (dot data) corresponding to C (cyan), M (magenta), Y (yellow) and B (black) by a printer controller 53 provided within the color image forming apparatus 60, respectively. The image data is inputted to the optical scanning devices 61, 62, 63 and 64, respectively. Then, light beams 41, 42, 43 and 44 which have been modulated in correspondence to the respective image data are emitted from the optical scanning devices 61, 62, 63 and 64, respectively. Photosensitive surfaces of the photosensitive drums 21, 22, 23 and 24 are scanned in the main scanning direction with those light beams 41, 42, 43 and 44, respectively.

The color image forming apparatus 60 in Embodiment serves to record an image corresponding to image signals (image information) on the surface of the photosensitive drums 21, 22, 23 and 24 in a parallel manner using the four optical scanning devices 61, 62, 63 and 64 corresponding to C (cyan), M (magenta), Y (yellow) and B (black), respectively, to print a color image at a high speed.

In the color image forming apparatus 60 in Embodiment, as described above, latent images corresponding to the respective colors are formed on the surfaces of the corresponding photosensitive drums 21, 22, 23 and 24, respectively, using the light beams based on the image data by the four optical scanning devices 61, 62, 63 and 64, respectively. Thereafter, the latent images are multiplexedly transferred onto one sheet of recording material to form a full-color image on the recording material.

A color image reading device including a CCD sensor for example may be used as the external device 52. In this case, a color digital copying machine is constituted by this color image reading device and the color image forming apparatus 60.

This application claims priority from Japanese Patent Application No. 2004-105246 filed Mar. 31, 2004, which is hereby incorporated by reference herein.

What is claimed is:

1. An optical element including a surface having a finite curvature, comprising a plurality of convex optical pieces having an anti reflection function, each of which is smaller than a design wavelength being provided on the surface having the finite curvature of the optical element, wherein the plurality of convex optical pieces are formed independently on surface having the finite curvature along a normal direction of the surface having the finite curvature, and wherein the plurality of the optical pieces are arranged in a random manner so as to satisfy the following conditional expression, $$D/200 < \sigma < D/10,$$

where D represents an average distance between the centers of the adjacent optical pieces and $\sigma$ represents the standard deviation.

2. An optical element according to claim 1, wherein letting $\lambda$ be a used wavelength, a following condition is satisfied:

$$D < \lambda/12.$$

3. An optical element according to claim 1, wherein each of the plurality of convex optical pieces becomes radially slenderer as distant from the surface of the optical clement having the finite curvature.

4. An optical element according to claim 1, wherein each of the plurality of convex optical pieces becomes radially slenderer stepwise as distant from the surface of the optical element having the finite curvature.

5. An optical element according to claim 1, wherein each of the plurality of convex optical pieces becomes radially slenderer in a tapered form as distant from the surface of the optical element having the finite curvature.

6. An optical element according to claim 1, wherein the surface of the optical element having the finite curvature and having the plurality of convex optical pieces formed thereon is a refracting surface.

7. An optical element according to claim 1, wherein the plurality of optical pieces are formed on the surface of the optical element having the finite curvature through molding.

8. A method of manufacturing an optical element that is the optical element according to any one of claims 1,2, and 3 to 7, comprising:

a mold manufacturing step of forming pores formed when aluminum or aluminum alloy is anodized on a surface of a mold; and an element forming step of transferring the pores using the mold to form the optical pieces.

9. An optical scanning device, comprising:

the optical element according to any one of claims 1,2, and 3 to 7; and an f$\theta$ lens having the optical element installed on its surface.

10. An image forming apparatus, comprising:

the optical scanning device according to claim 9;

a photosensitive member disposed on a surface to be scanned;

a developing device for developing an electrostatic latent image formed on the photosensitive member with light beams scanned by the optical scanning device as a toner image;

a transferring device for transferring the toner image obtained through the development to a transfer material; and a fixing device for fixing the transferred toner image on the transfer material.

11. An image forming apparatus, comprising:

the optical scanning device according to claim 9; and a printer controller for converting code data inputted from an external device into an image signal to input the image signal to the optical scanning device.

* * * * *

UNITED STATES PATENT AND TRADEMARK OFFICE
CERTIFICATE OF CORRECTION

PATENT NO. : 7,268,948 B2  Page 1 of 1
APPLICATION NO. : 11/088847
DATED : September 11, 2007
INVENTOR(S) : Yasuhiro Matsuo et al.

It is certified that error appears in the above-identified patent and that said Letters Patent is hereby corrected as shown below:

COLUMN 17:
Line 30, "anti reflection" should read --antireflection--.
Line 34, "on" should read --on the--.
Line 48, "12" should read --2--.
Line 51, "clement" should read --element--.

Signed and Sealed this

Thirteenth Day of May, 2008

JON W. DUDAS
*Director of the United States Patent and Trademark Office*